Sept. 24, 1963         F. G. VON SAURMA         3,104,854
                       STEERABLE ROTARY CHUTE
Filed Oct. 6, 1959                              7 Sheets-Sheet 1

Friedrich G.von Saurma,
           INVENTOR.
BY S. J. Rotondi,
   A. T. Dupont, and
   Alvin E. Moore,
        ATTORNEYS.

Sept. 24, 1963     F. G. VON SAURMA     3,104,854
STEERABLE ROTARY CHUTE
Filed Oct. 6, 1959     7 Sheets-Sheet 2
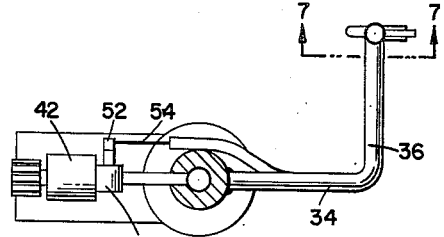
FIG.6.
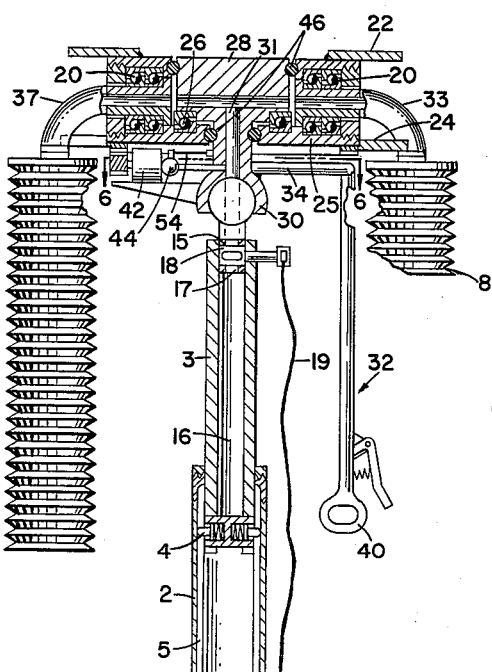
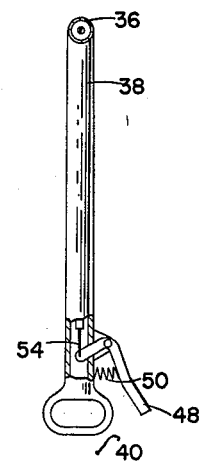
FIG.7.
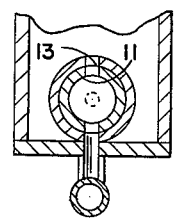
FIG.5.
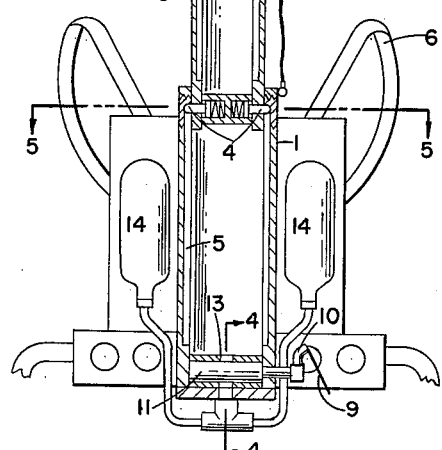
FIG.4.
FIG.3.
Friedrich G. von Saurma,
INVENTOR.
BY S. J. Rotondi,
A. T. Dupont, and
Alvin E. Moo
ATTORNEYS.

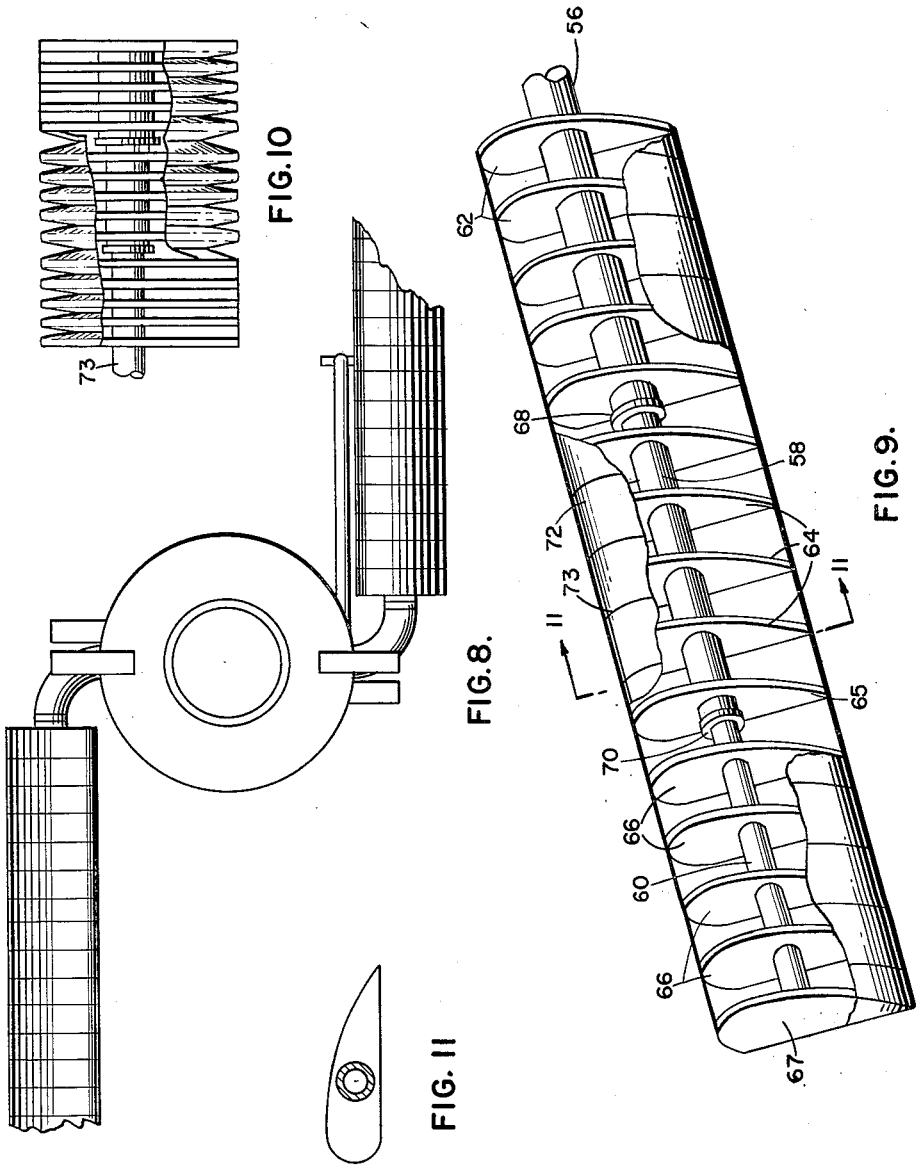

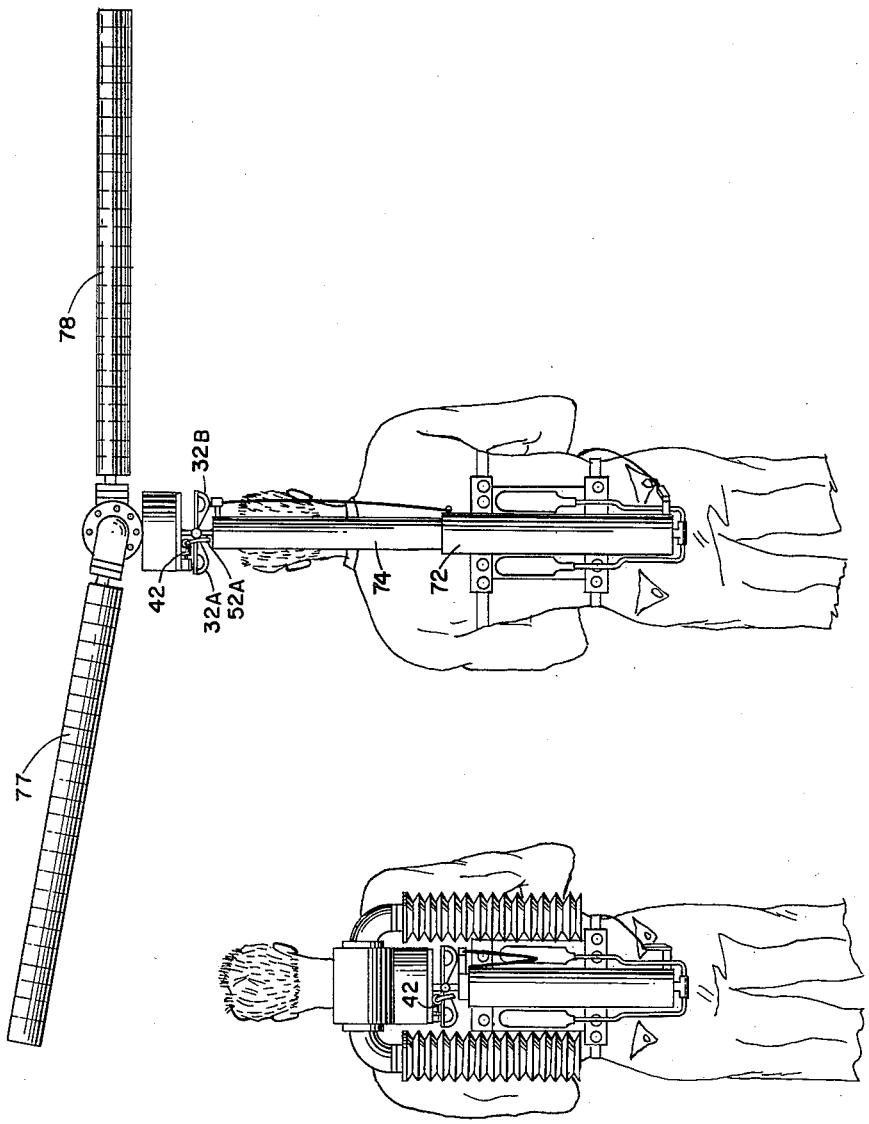

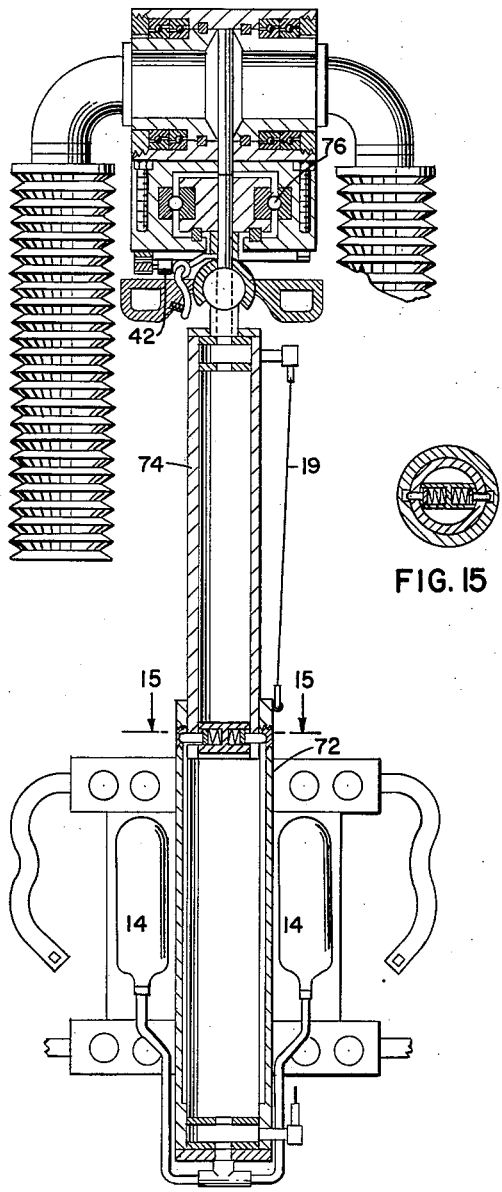
FIG. 15
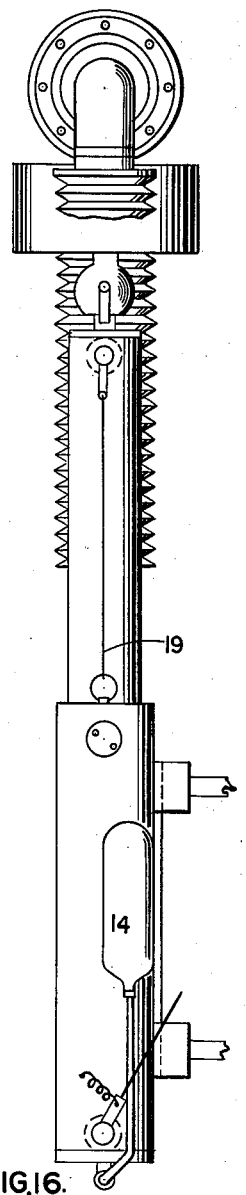
FIG. 14
FIG. 16.
Friedrich G. von Saurma,
INVENTOR.
BY S. J. Rotondi,
A. T. Dupont, and
Alvin E. Moore,
ATTORNEYS.

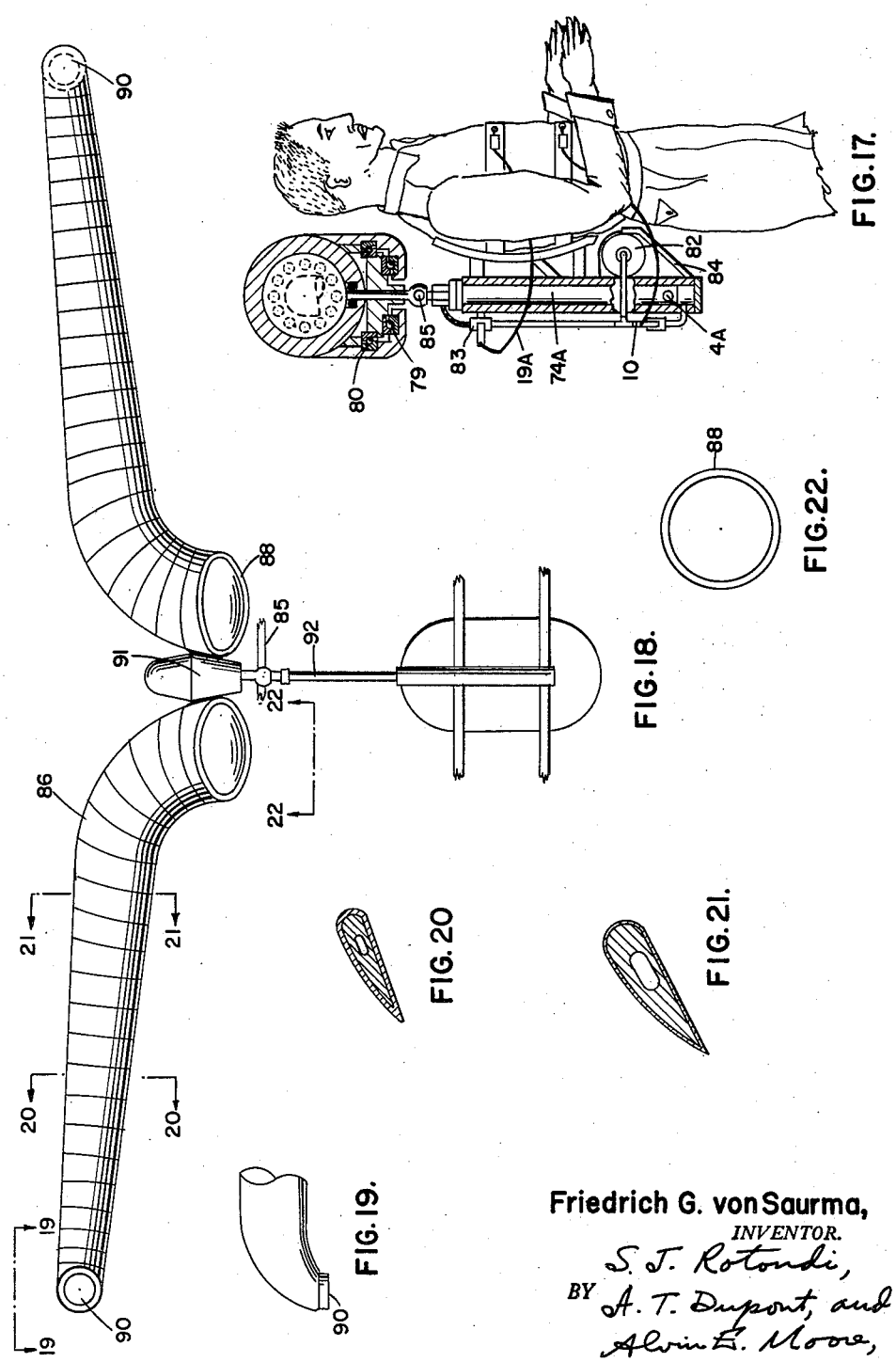

Sept. 24, 1963 F. G. VON SAURMA 3,104,854
STEERABLE ROTARY CHUTE
Filed Oct. 6, 1959 7 Sheets-Sheet 7
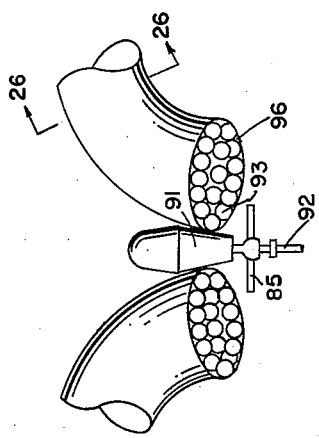
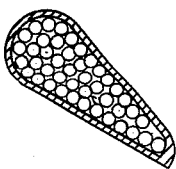
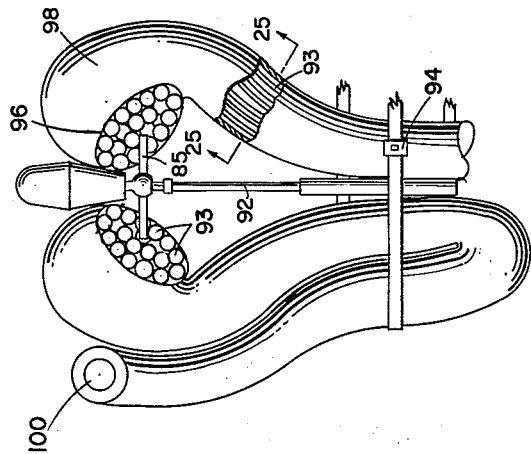
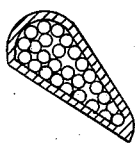
Friedrich G. von Saurma,
INVENTOR.
BY
ATTORNEYS.

United States Patent Office 3,104,854
Patented Sept. 24, 1963

3,104,854
STEERABLE ROTARY CHUTE
Friedrich G. von Saurma, 3309 Panorama Drive SE.,
Huntsville, Ala.
Filed Oct. 6, 1959, Ser. No. 844,835
10 Claims. (Cl. 244—138)
(Granted under Title 35, U.S. Code (1952), sec. 266)

The invention described herein may be manufactured and used by or for the Government for governmental purposes without the payment of any royalty thereon.

This invention relates to a steerable rotary chute. It comprises wings or airfoils that may be supported in a collapsed state by a parachutist, and inflated as the parachutist jumps, which are rotated by the wind of descent, and may be adjusted during descent for guidance of the parachutist to a desired location.

Such a rotary chute has numerous advantages over an ordinary parachute. Since it derives a considerable portion of its lifting force from its autorotation it is of much smaller bulk than a conventional parachute of equal lift. In military use, it is therefore much less easily discovered by an opposing force; and, moreover, it may be easily camouflaged by blue or blue-gray paint. Another, and probably its greatest, advantage lies in the fact that it may be controlled during descent and therefore utilized to guide the parachutist away from trees and other hazards and to a safe landing spot. At the time of landing it may be tilted to reduce or eliminate its lift, so that the parachutist is not bounced or dragged over the area of his landing by the aerodynamic force on an unwiedly parachute of conventional design.

In view of the above facts, it is an object of this invention to provide a collapsible and inflatable wind-rotated parachute.

Another object of the invention is to provide a rotary chute having a tiltable, rotatable hub, wind-rotated, inflatable lifting vanes on said hub, and means for tilting said hub and vanes for steering the rotary chute during descent.

A further object of the invention is to provide a rotary chute comprising a support, bearings thereon, a tiltable and steerable rotor journalled on said bearings, and means for counteracting the tendency of the friction of the bearings to rotate the parachutist, whereby the parachutist may control the direction that he faces during his descent.

The foregoing and other objects of the invention will become more fully apparent from the following detailed description of exemplary structure embodying the invention, and from the accompanying drawings, in which:

FIGURE 3 is a sectional, elevational view of the rotary chute, showing its telescoped supporting mast as being nearly opened to the fully extended position that provides clearance between the rotor and the parachutist's head.

FIGURE 4 is a sectional, detail view from the plane indicated by lines 4—4 in FIGURE 3.

FIGURE 5 is a sectional, detail view from the plane 5—5 of FIGURE 3.

FIGURE 6 is a view in section from the plane 6—6 of FIGURE 3.

FIGURE 7 is a sectional, detail view from the plane 7—7 of FIGURE 6.

FIGURE 8 is a plan view of the invention, showing the rotary chute vanes in their inflated, rotatable position during descent, and as partly broken away.

FIGURE 9 is a detail view of one of the vanes in its extended position, with part of its cover broken away, to show details of its framing.

FIGURE 10 is a detail view, of another form of collapsible, autorotating vane.

FIGURE 11 is a sectional view from plane 11—11 of FIGURE 9.

FIGURE 12 is a rear elevational view of another form of the invention, showing the rotary chute in collapsed position.

FIGURE 13 is a rear elevational view of the form of the invention shown in FIGURE 12, with the rotary chute in open, inflated position.

FIGURE 14 is an elevational view, mainly in section, of the rotary chute of FIGURE 12, having parts broken away.

FIGURE 15 is a sectional view from the plane 15—15 of FIGURE 14.

FIGURE 16 is a side elevational view of the rotary chute of FIGURE 14, with parts of the structure broken away.

FIGURE 17 is an elevational view, partly in section, of a third form of the rotary chute.

FIGURE 18 is an elevational view of a fourth form of the invention, partly broken away.

FIGURE 19 is a detail plan view from the plane 19—19 of FIGURE 18.

FIGURES 20 and 21 are sectional views from the plane 20—20 and 21—21 of FIGURE 18.

FIGURE 22 is a detail view upward from the plane 22—22 of FIGURE 18.

FIGURE 23 is a rear elevational view, partly broken away, of a fifth form of the rotary chute.

FIGURE 24 is a deail view of the roots of the rotary chute vanes of FIGURE 23.

FIGURE 25 is a sectional view from the plane 25—25 of FIGURE 23.

FIGURE 26 is a sectional view from the plane 26—26 of FIGURE 24.

Figure 2:
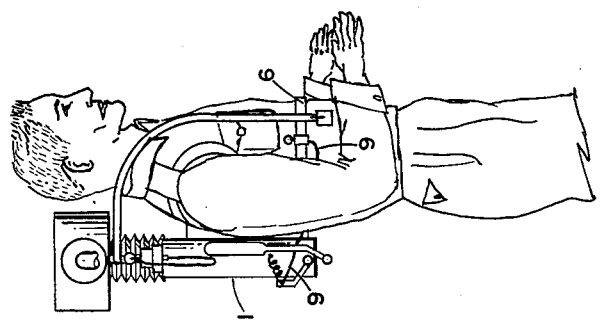
FIGURE 2 is a side elevational view of this form of the invention.
Figure 1:
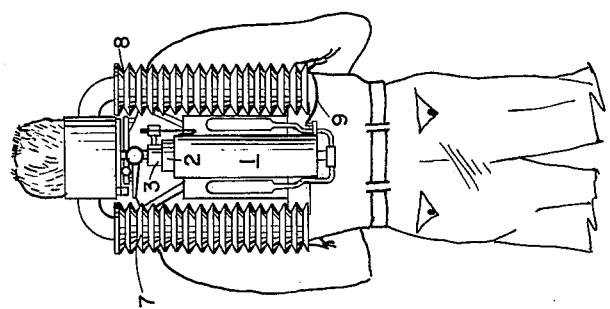
FIGURE 1 is a rear elevational view of one form of the rotary chute of this invention, shown as in collapsed form on the back of a parachutist, before his descent.

FIGURES 1 to 9 illustrate a form of the invention which comprises a collapsible rotor-supporting mast of three telescoped parts, 1, 2 and 3. In FIGURE 3, part 2 is shown as having been extended by compressed air or other gas from its position of FIGURE 1 to its upper limit, determined by spring-pressed stops 4, which slide in grooves 5. Part 3 is also shown as having been extended, but this part has not reached the upper limit of its travel.

The telescoped mast is adapted to be supported on the back of a parachutist by means of harness 6. In the position of the rotary chute in FIGURES 1 and 2 the mast is collapsed, and out of the way of the parachutist's head; and the rotary lifting vanes 7 and 8 also are collapsed, and are pivoted downward so as to be approximately parallel with the parachutist's body. In this position, therefore, the parts do not interfere with a jump by the parachutist from a restricted doorway or hatch of an aircraft, or a missile that has re-entered the earth's atmosphere. As he jumps, the parachutist pulls wire or cable 9 and locks it in taut position by a common fastening device, thus pivoting lever 10 and inner valve cylinder 11, against the action of a spring, and placing the inner valve port in register with outer valve port 13. Compressed air or other gas then flows from bottles 14 thru the valve into the nested mast tubes and exerts an upward force on the upper end of tube 3. This upper end is closed by valve casing 15, which is flanged to completely cover the bore 16 except for valve ports 17. Valve casing 15 houses valve cylinder 18, which is similar to lower valve cylinder 11. As shown in FIGURE 3, valve-operating cable 19 is not taut and the ports of the upper valve are not in alignment. In the next instant of the extension of the mast, however, tube 3 is moved to its upper limit, and cable 19 is tightened and pivots element 18, thus placing the valve ports in register. With the rotor's hub then being above the parachutist's head, compressed air passing through shanks 33, 37 begins to open accordion vanes 7 and 8; and the wind of descent pivots them on bearings 20 into the substantially horizontal position shown in FIGURE 8. This upward pivoting is limited by stops 22. Similar stops 24 limit the downward pivoting of the collapsed vanes, so that, in opening to operative position, they must pivot upward in opposite directions.

The rotor hub comprises disk 25 which is journalled on bearings 26, thus transmitting the upward thrust of the rotor to thrust collar 28. This collar or bearing support is connected to mast tube 3 by ball-and-socket joint 30 (or else by means of a common single-axis or universally-gimballed pivot bearing). The joint is bored to permit, in all its positions, the passage of air from bore 16 to channel 31.

The upper part of the joint may be pivoted relative to tube 3 by hand-operated lever assembly 32. This assembly comprises: arm 34, which is welded or otherwise fixed to element 28 above the pivotal axis or point of joint or bearing 30; integral, forwardly extending arm 36; integral downwardly extending arm 38; and handhold 40. When this handhold or grip is moved forward or backward by the parachutist in descent the rotor is tilted, so that the angle of his downward glide is varied, to maneuver his position in the air or vary his landing spot. With the ball-and-socket joint 30, the parachutist may tilt the rotor in any direction; but with the optional, two-axis pivot bearing only a forward or rearward tilting would be feasible.

In any event, the invention preferably comprises a spin-control motor 42. This motor may be electric, but preferably is a turbine of conventional design, operated by compressed air received from channel 31, via valve 44. Escape of the pressurized air is prevented by O-ring seals 46. Valve 44 is similar to valve 11, and may be opened by the parachutist's actuation of thumb-operated lever 48, against spring 50, thus operating lever 52 by means of cable or wire 54.

In operation, the wind-rotated rotor tends to drag the parachutist around with it, in a slow rotation, due to the friction of bearings 26. This is counteracted by providing for a reaction on the housing of motor 42 and on the parachutist, by driving the rotor slightly faster than its speed due to the wind's rotation of the lifting vanes. Valve 44 is opened until the parachutist's bodily rotation is stopped, and he faces toward his desired landing place.

In FIGURE 9 one form of lifting vane construction is shown. This vane comprises three telescopic tubes, 56, 58 and 60, with the tube of largest diameter, 56, being nearest to the hub or center of rotation. Plastic ribs 62 are fixed on tube 56; whereas ribs 64 and 66 are slidably mounted on tubes 58 and 60, and are moved inward by collars 68 and 70 when the vane is collapsed. End ribs 65 and 67 preferably are fixed to their tubes. Cover 72 may be of rubber or plastic, has accordion-like fold lines 73, and is glued or otherwise fixed to the ribs.

In FIGURE 10 all the ribs are slidable on telescopic tubes, with the tube of smallest diameter, 73, being nearest to the center of rotation. This form of vane telescopes into smaller lateral space than does the form of FIGURE 9.

In FIGURES 12 to 16 a second form of the rotary-chute is shown. This form comprises a rotor-supporting mast of only two tubes, 72 and 74. Valve-operating cable 19 is shown in FIGURES 14 and 16 as having opened the upper valve, and the lifting vanes are on the point of being inflated and opened. In lieu of thrust bearing 26 of FIGURE 3, a radial-and-thrust bearing 76 is provided. In lieu of lever 32, a shorter lever, comprising handholds 32A and 32B, is utilized for turning the hub on its bearings; and valve-operating lever 52A (similar to lever 52 of FIGURE 6) is operated by the parachutist's left hand. Thus the operator may control his arc of vision during his descent by manually moving lever 52A, thus actuating motor 42 and rotating the hub; and he controls the angle of his descent by tilting the rotor by means of handholds 32A and 32B. Except for the above-mentioned changes in the bearings, mast and manual control means the details of this form of the invention, including the vanes, valves, motor 42 and gearing, are the same as those of the form of FIGURES 1 to 8.

In FIGURE 13 vane 77 is shown as rotating into the relative wind, and therefore as having risen on its pivots, against the action of centrifugal force; whereas vane 78, rotating with the relative wind, has balanced the centrifugal force by aerodynamic force, without the necessity of appreciably rising.

In the third form of the rotary chute, shown in FIGURE 17, two radial-and-thrust bearings 79 and 80 are shown; and in lieu of the two small compressed-air bottles 14, only one bottle, 82, is utilized. This bottle is supported at the small of the parachutist's back by means of brackets 84. It supplies compressed air via a lower valve that is similar to valve 11 of FIGURE 3, and via an upper valve 83 that is similar to valve 15–18 of FIGURE 3 but is differently operated. The cable 19A of FIGURE 17 is manually actuated after upper part 74A of the telescoped mast is fully extended to its upper position by the force of the compressed air that passes thru the lower valve. Upper part 74A has spring-pressed support pins 4A that are similar to pins 4 of FIGURE 3. Control of the direction of descent is achieved by manual operation of control handles 85 (shown more clearly in FIGURES 18 and 23). The parachutist first rotates the hub and then tilts it in the desired plane of descent, thus controlling the speed and angle of descent.

The fourth form of the invention, shown in FIGURES 18 to 22, comprises wind-rotated lifting wings 86 that are made of rubber or plastic, have an airfoil shape in cross section, as shown in FIGURES 20 and 21, and circular air inlets 88 and air-nozzle outlets 90. The wings are fastened to hub 91, which is rotatable on bearings supported by the upper tube 92 of the telescopic mast. The vanes are fixed to hub 91 which, like the form of FIGURE 18, is journalled on the upper element 92 of a two-part telescopic mast. Part 92 has spring-pressed stop pins at its lower end that are similar to pins 4 of FIGURE 3.

In operation, the wind of descent enters each hollow vane at 88, expands the accordion vane from its folded position on the parachutist's back, and exhausts thru nozzle 90, thus causing the vane to rotate. As the vanes are preferably of autogyro configuration, another force on them that tends to rotate them is the relative wind of the descent. As they turn, they exert a lifting force.

In the fifth form of the invention, shown in FIGURES 23 to 26, which is similar to the form of FIGURE 18, each rotor vane is made up of numerous hollow tubes 93. These tubes provide extra stiffness for the vanes, which tends to open them quickly when buckle or other fastener 94 is opened or ruptured by the parachutist. In operation, the wind of descent enters each of the tubes 93 thru its open lower end, that is adjacent opening 96 in the vane's cover 98, and debouches from the tube's outer end, just inside of nozzle 100. Thus the various small streams of air thru the tubes are merged and forced out thru the nozzles, aiding in the rotation of the lifting, descent-braking airfoils.

The invention comprehends various obvious changes in structure from that herein illustrated, within the scope of the subjoined claims.

The following invention is claimed:

1. A wind-rotatable parachute comprising: a mast having telescopically assembled tubes, means for supplying pressurized fluid to the interior of said tubes so as to force them into an extended position, said mast being constructed and arranged for attachment in a vertical position to the back of the parachutist; means for detachably fastening said mast to the back of a parachutist; said mast, when in fastened position on the back of the parachutist being of such a length in its retracted position that its upper end is below the head of the parachutist, and of such a length in its fully-extended position that its upper end is above the head of the parachutist; bearings supported by said upper end of the mast; a rotor journalled on said bearings, said rotor comprising: a hub, vanes having flexible vane skins of air foil configuration; means connecting said vanes to said hub, said vanes being constructed and arranged to be rotatable by the relative wind of the parachutist's descent and to exert an aerodynamic lifting force on the descending parachutist.

2. A device as set forth in claim 1, in which said mast comprises three telescopic tubes.

3. A device as set forth in claim 1, in which said mast comprises two telescopic tubes.

4. A device as set forth in claim 1, in which: said vane skins are closed at their outer ends, thus providing air-retaining hollow spaces in said vanes; said mast comprises three telescopic tubes.

5. A device as set forth in claim 4, in which said means connecting the vanes to the hub comprises shanks on said vanes and vane bearings in said hub, said shanks journalled in said vane bearings; means comprising a passageway thru said hollow tubes and conduits in said shanks, for flow-connecting said supply means and said hollow spaces; and manually controllable valve means flow-connected with said passageway between said supply means and said hollow space, whereby said skins may be inflated and extended during the parachutist's descent.

6. A device as set forth in claim 4, in which said shanks are perpendicular to the longitudinal axis of said vane skins.

7. A device as set forth in claim 5, in which said rotor journalling bearings comprise a thrust bearing support, said device further comprising a thrust-taking pivot bearing that connects said thrust bearing support to said upper tube, and manually operable means, rigidly attached to said thrust bearing support, to tilt said rotor for directional control of said device and parachutist.

8. A device as set forth in claim 7, which further comprises: a compressed-air motor, fixed to said thrust bearing support; reduction gearing connecting said motor and rotor; air-conducting means connecting said motor with said flow-connecting passageway; and a manually controllable valve in said air-conducting means; whereby the reaction from said motor, tending to rotate the parachutist, may be controlled by the parachutist, thus orienting his line of sight.

9. A device as set forth in claim 1, in which said rotor comprises an even number of vanes, and in which each of said vanes has an elongated interior space, having an opening at its root from the radially inner part of said space to the atmosphere, and has an air nozzle at its tip for discharging air from the radially outer part of said space to the atmosphere, each pair of vanes being arranged in balanced relationship relative to the axis of said mast and to each other, the two nozzles of said pair being oppositely directed, whereby air enters said rotor at the roots of said vanes and debouches from said rotor at the vane tips, thus exerting a rotational force on said rotor.

10. A device as set forth in claim 9, in which each of said vanes further comprises a group of flexible tubes, substantially filling and transversely extending and stiffening said skins, each of said tubes having an opening for the entry of air from said opening at the vane's root and having a second opening for the discharge of air into said elongated space adjacent said nozzle.

References Cited in the file of this patent

UNITED STATES PATENTS

| | | |
|---|---|---|
| 2,239,670 | Burgess | Apr. 29, 1941 |
| 2,334,028 | Raio | Nov. 9, 1943 |
| 2,510,276 | Bickers | June 6, 1950 |
| 2,654,320 | Schmid | Oct. 6, 1953 |
| 2,776,017 | Alexander | Jan. 1, 1957 |
| 2,836,383 | Oleksij | May 27, 1958 |
| 2,996,121 | Stub | Aug. 15, 1961 |

FOREIGN PATENTS

| | | |
|---|---|---|
| 660,793 | Germany | June 2, 1938 |
| 425,131 | Italy | Sept. 13, 1947 |